June 17, 1952 J. V. S. DAHLGREN 2,600,622
WINDSHIELD CLEANER DRIVE
Filed Jan. 21, 1949 5 Sheets-Sheet 1
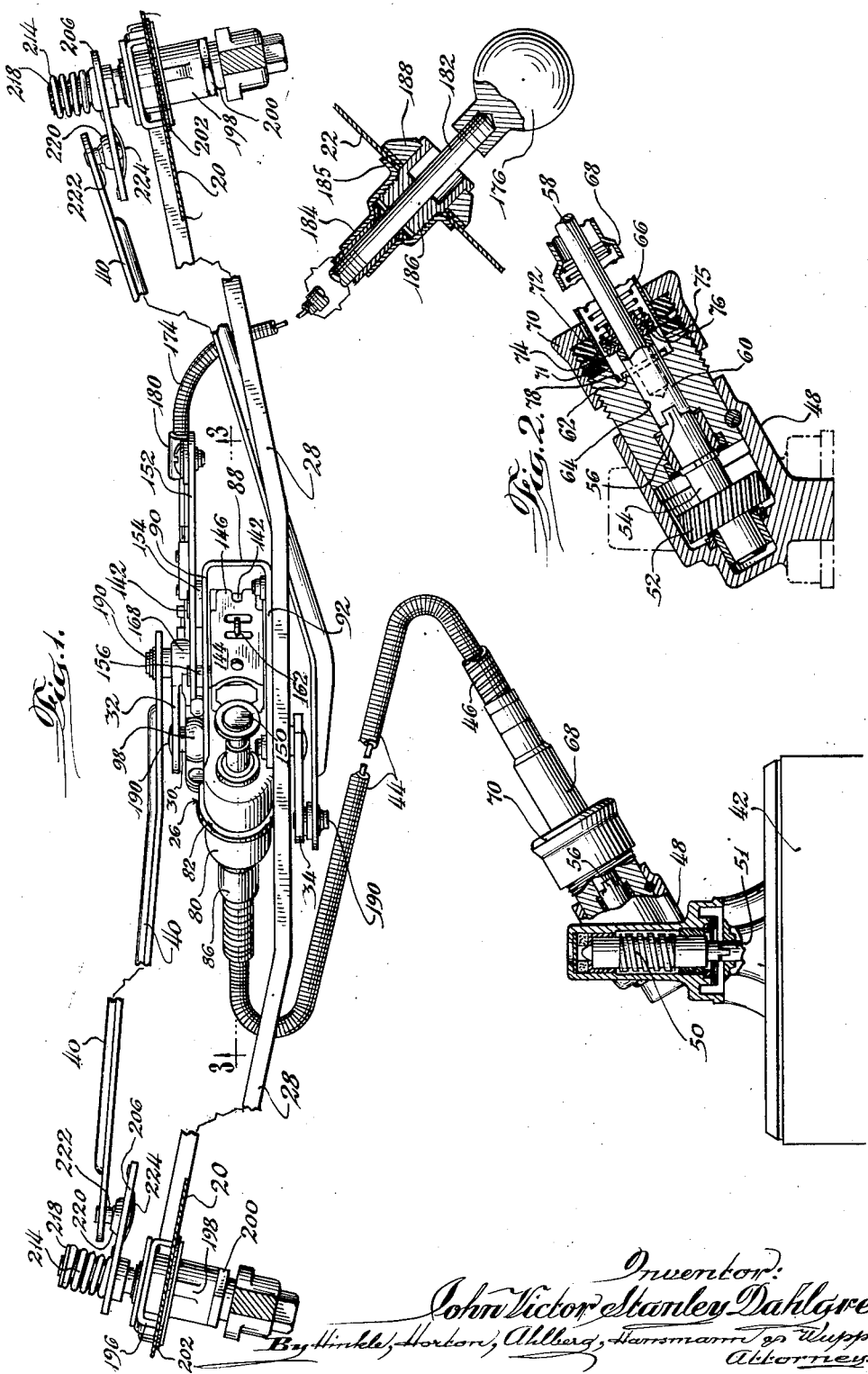
Inventor:
John Victor Stanley Dahlgren
By Hinkle, Horton, Ahlberg, Hansmann & Wupper
Attorneys

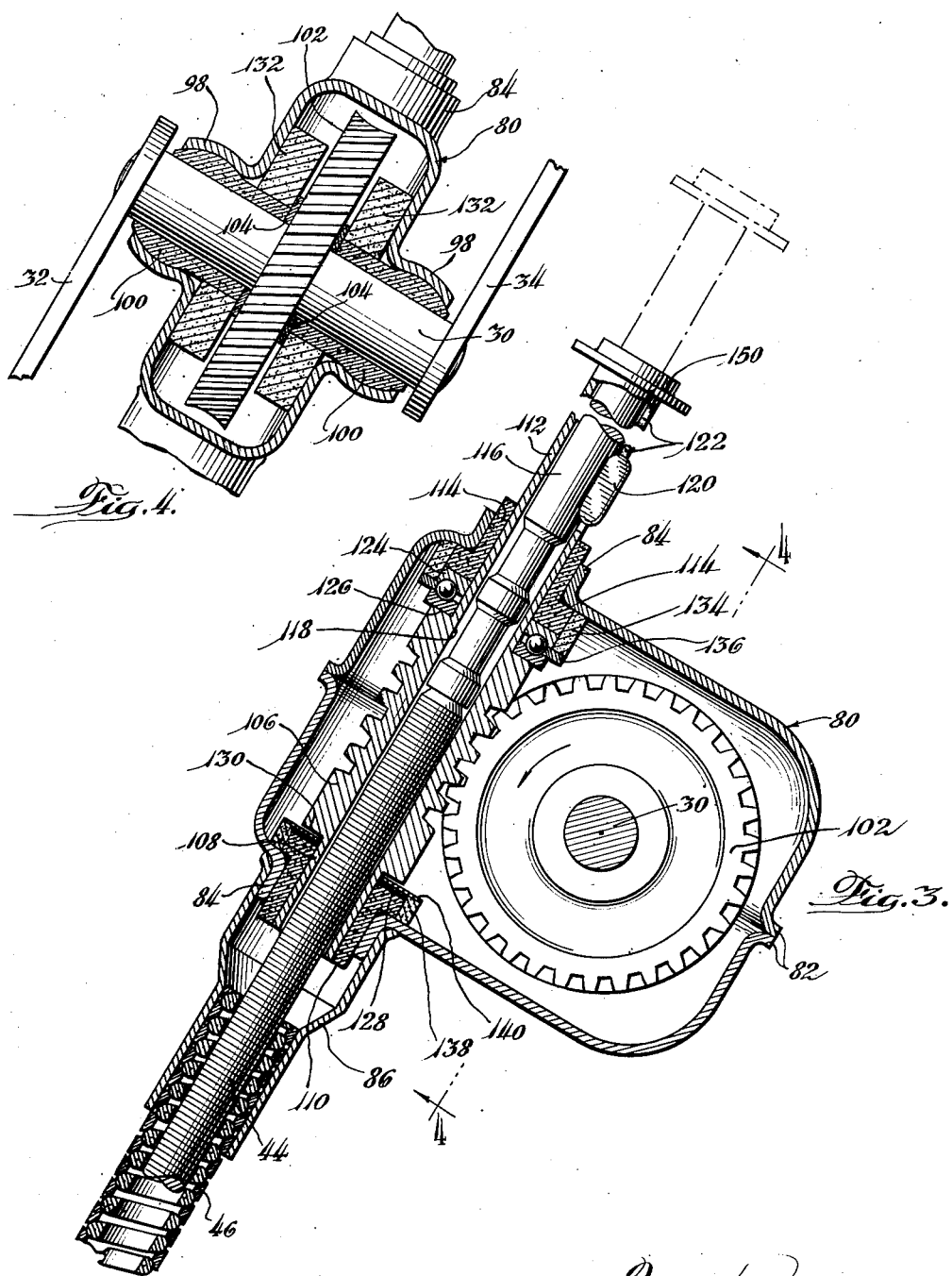

June 17, 1952 J. V. S. DAHLGREN 2,600,622
WINDSHIELD CLEANER DRIVE
Filed Jan. 21, 1949 5 Sheets-Sheet 3
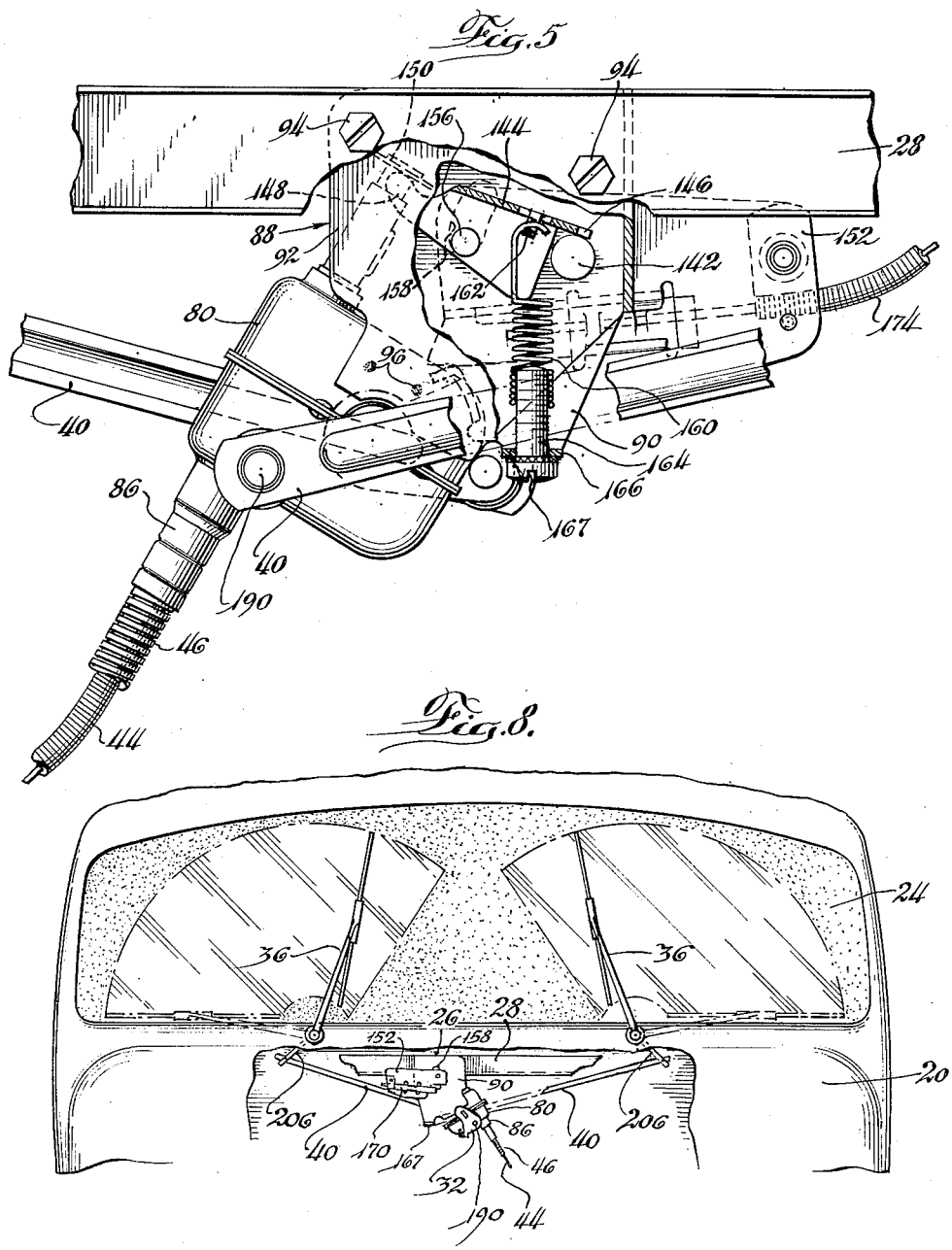
Inventor:
John Victor Stanley Dahlgren
By Hinkle, Horton, Ahlberg, Hanemann & Wupper
Attorneys.

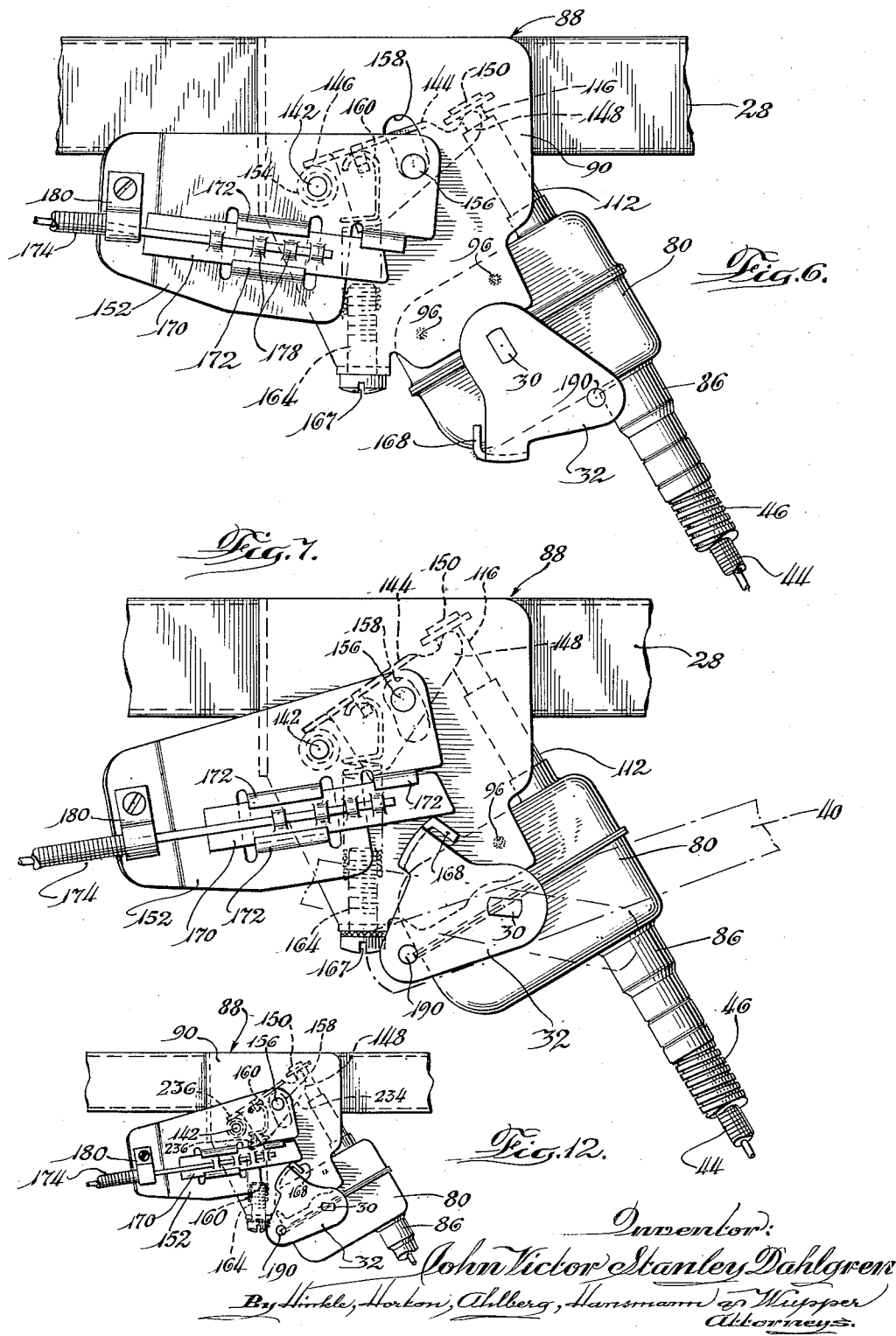

June 17, 1952     J. V. S. DAHLGREN     2,600,622
WINDSHIELD CLEANER DRIVE
Filed Jan. 21, 1949     5 Sheets-Sheet 5
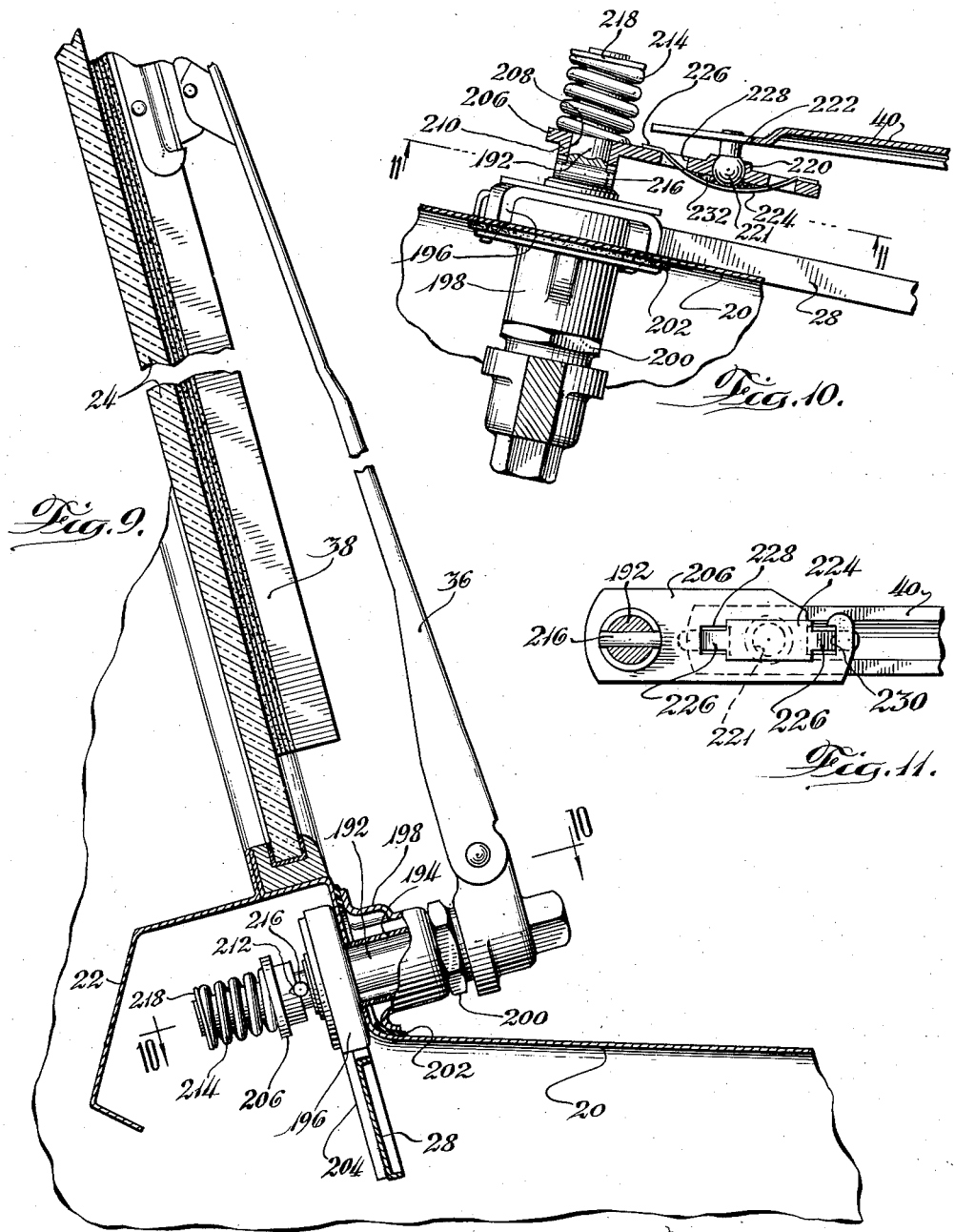
Inventor:
John Victor Stanley Dahlgren
By Hinkle, Horton, Ahlberg, Hansmann & Wupper
Attorneys.

Patented June 17, 1952

2,600,622

UNITED STATES PATENT OFFICE 2,600,622

WINDSHIELD CLEANER DRIVE

John Victor Stanley Dahlgren, Chicago, Ill., assignor to Stewart-Warner Corporation, Chicago, Ill., a corporation of Virginia Application January 21, 1949, Serial No. 71,924

14 Claims. (Cl. 74—70)

The present invention relates to windshield cleaners and more particularly to an improved mechanically operated windshield cleaner.

An object of the invention is to provide a windshield cleaner operating mechanism adapted to be driven from a rotary source of power which has a declutching mechanism for disconnecting the operating mechanism at the source of power so that the entire operating mechanism remains idle when the cleaner is not being operated.

Another object of the invention is to provide a mechanically operated windshield cleaner which has an improved declutching mechanism and control therefor that automatically disconnects the drive to the cleaner operating mechanism when the cleaner blades reach parked position irrespective of when the control for the declutching mechanism is actuated.

A further object of the invention is to provide a mechanically operated windshield cleaner having an improved declutching mechanism in which the power for effecting declutching of the operating mechanism from its source of power is derived through the shaft which connects the operating mechanism and the source of power.

A still further object of the invention is to provide a mechanically operated windshield cleaner which has an improved cleaner operating and declutching mechanism that eliminates the need for special parking mechanism to park the blades when operation of the cleaner is discontinued.

Yet another object of the invention is to provide a new and improved windshield cleaner that has means for positively disconnecting the cleaner operating mechanism from its source of power.

Another object of the invention is to provide a windshield cleaner having a new and improved declutching mechanism yieldable upon jamming of the clutch means connecting the cleaner operating mechanism and its source of power so as to avoid damage to the declutching mechanism or other parts of the operating mechanism of the cleaner.

A further object of the invention is the provision in a windshield wiper of a new and improved slip drive connection between the wiper operating mechanism and the wiper rock shaft which allows the wiper blade to be arrested during normal operation of the cleaner without damage to the parts.

A further object of the invention is the provision of a new and improved driving connection between a reciprocable member and a rotatable or rockable member which allows for limited universal movement between these members without interfering with the driving connection between the members.

A more general object of the invention is to provide a windshield cleaner which may be made primarily from inexpensive sheet metal stampings and standard parts and which is easy to assemble and install so that it may be sold and installed at relatively low cost, but which nevertheless is sturdy and not subject to breakdowns.

These and other objects, advantages and capabilities of the invention will become apparent from the following description wherein reference is had to the accompanying drawings, in which:

Fig. 1 is a top plan view of the improved windshield cleaner of the present invention with parts thereof shown in assembled relation, certain of these parts being shown in section and on an enlarged scale more clearly to disclose their structure, the wiper arms and wiper blades being omitted;

Fig. 2 is an axial sectional view on a horizontal plane and on an enlarged scale through the power take-off which drives the cleaner drive shaft showing the clutch means for connecting the drive shaft to a rotary source of power;

Fig. 3 is a vertical sectional view on an enlarged scale of the gear train in the cleaner operating mechanism taken in the direction of the arrows on the line 3—3 of Fig. 1;

Fig. 4 is a sectional view taken on the line 4—4 of Fig. 3;

Fig. 5 is a fragmentary rear elevational view of the cleaner operating mechanism with parts broken away better to show the construction of this operating mechanism;

Fig. 6 is a front elevational view of the cleaner operating mechanism showing the position the parts assume when the declutching mechanism is in inoperative position;

Fig. 7 is a view similar to Fig. 6 but showing the position of the parts when the declutching mechanism is in operative position and the operating mechanism is disconnected from its source of power;

Fig. 8 is a more or less diagrammatic front elevational view of a fragment of an automotive vehicle showing the improved cleaner secured thereto;

Fig. 9 is a view partly in vertical section and partly in irregular section showing the crank arm on the wiper rock shaft and the manner in which this shaft is mounted on the cowl of a vehicle;

Fig. 10 is a sectional view taken on the line 10—10 of Fig. 9;

Fig. 11 is a fragmentary view taken on the line 11—11 of Fig. 10 showing the crank arm on the wiper rock shaft in plan; and Fig. 12 is a view similar to Fig. 7 showing an operating mechanism of modified construction.

For the purpose of illustrating the invention, the improved windshield cleaner will be described as applied to an automotive vehicle having a cowl 20, an instrument panel 22, and a windshield 24, as shown in Figs. 8 and 9. The improved windshield cleaner includes operating mechanism 26 which is adapted to be secured under the cowl and behind the instrument panel of the vehicle. This operating mechanism 26 is supported from the intermediate part of a supporting bar 28 which may be an elongated channel iron suspended at opposite ends from the framework of the automotive vehicle in a manner to be described.

The operating mechanism 26 includes a rotatable actuating shaft 30 (Figs. 1 and 8) having front and rear cranks 32 and 34, respectively, fixed upon opposite ends thereof. These cranks drive a pair of wiper blade arms 36 to which blades 38 are secured through a pair of oppositely extending links 40. The operating mechanism 26 is driven from an engine accessory such as a generator 42 by means of a flexible drive shaft assembly 44 which is enclosed in a flexible housing 46 and which is adapted to be clutched and declutched with a power take-off 48 secured to the end of the housing for the generator 42 (Figs. 1 and 2).

The power take-off 48 includes a worm 50 having a driving connection with the generator shaft 51 and a worm wheel 52 driven by the worm 50 and fixed upon a shaft 54 rotatably mounted in the housing of the power take-off 48. Once the take-off has been mounted in position, a permanent driving connection is thus established between the worm wheel 52 and generator shaft 51 so that the worm wheel and shaft are continuously rotated when the engine which drives the generator is operating. The worm wheel shaft 54 has a lug 56 on its outer end so that this shaft forms the driving element of a clutch mechanism for establishing a driving connection between the power take-off 48 and the flexible drive shaft 44. Fixed to the lower end of the latter shaft is a rigid extension 58 (Fig. 2) to the free end of which the driven element 60 of the clutch mechanism is nonrotatably secured by means of a pin 62 extending diametrically through the parts. The driven element 60 has a slot for receiving the lug 56 on the worm wheel shaft 54 when the driving and driven elements are moved to engaged or operative position. A bore 64 in the body of the power take-off loosely receives the confronting ends of the driving and driven elements and maintains these parts of the clutch in axial alignment. Preferably the pin 62 is designed to shear in case of overload to protect the operating mechanism from damage.

The axially movable clutch element 60 is urged to engaged position by a coil spring 66 (Fig. 2) surrounding the extension 58 and housed in a sleeve 68 which is attached to the lower end of the drive shaft housing 46. At its lower end the sleeve 68 is detachably connected to the outer end of the body of the take-off 48 by means of a cap 70 threaded on this end. Resilient washers 71 and 72 are engaged respectively between the end wall of the power take-off 48 and a terminal flange 74 on the lower end of the sleeve 68 and between the flange 74 and the cap 70 for establishing a fluid-tight seal between these parts to prevent escape of the lubricant which is normally packed in the flexible shaft housing 46, and particularly to prevent the transmission of generator and engine noise along the flexible shaft housing 46 to the interior of the vehicle.

In the assembled structure the spring 66 reacts between a shoulder adjacent the upper end of the sleeve 68 and a washer 75 and suitable antifriction and thrust bearing 76 received upon the extension and abutting against the upper end of the driven element 60. Inward movement of this clutch element 60 under the influence of the spring 66 is limited by engagement of the slotted end of the element 60 against the end of element 54.

When the clutch elements 54 and 60 are in engaged position, the flexible shaft assembly 44 drives the operating mechanism through a gear train enclosed in a stamped sheet metal housing or gear box 80 (Figs. 3, 4 and 5). This gear box includes complementary upper and lower sections secured together by riveting or welding along their confronting flanged edges 82. Flanged apertures 84 which lie in aligned relation in the assembled gear box are provided in its upper and lower walls. The upper end of the flexible drive shaft housing 46 is secured to the bottom wall of the gear box by means of a sleeve 86 fixed at one end to the upper end of the shaft housing 46 and welded or otherwise secured at its opposite end to the flange on the aperture 84 in the bottom wall of the gear box.

This gear box and the balance of the operating mechanism of the cleaner are supported from the supporting bar 28 by means of a generally U-shaped supporting bracket 88 (Figs. 1, 5 and 6) having a front flange 90 and a back flange 92. The back flange or wall 92 of this bracket is secured along its upper edge to the front side of the bar 28 by means of a pair of lock washer screws 94 (Fig. 5). Along their lower ends, the flanges 90 and 92 on the supporting bracket are formed to embrace the sides of the upper half of the gear box 80 and the latter is welded thereto as indicated at 96 in Figs. 5 and 6.

In addition to the previously mentioned flanged apertures 84, the gear box 80 is provided with generally socket shaped flanges 98 (Fig. 4) extending outwardly from the front and back walls thereof. These latter flanges support a pair of bearing bushings 100 in which the actuating shaft 30 rotates. Fixed to the portion of the shaft within the gear box 80 is a worm wheel 102 which forms part of the gear train in the wiper operating mechanism. It is spaced from the inner ends of the bushings 100 by a pair of washers 104.

The worm wheel 102 is driven by a worm 106 (Fig. 3) having a reduced lower end part 108 forming a journal which is rotatably supported in a bearing bushing 110 which in turn is supported in the flanged aperture 84 in the bottom wall of the gear box. On its upper end the worm 106 is provided with a reduced extension 112 which projects outwardly from the upper side of the gear box a considerable distance. This end of the worm is rotatably supported in a bearing bushing 114 similar to the bushing 110, and fixed in the flanged aperture 84 in the upper wall of the gear box.

A driving connection between the flexible shaft 44 and the worm 106 is established through a rigid extension shaft 116 (Fig. 3) fixed to the upper end of the flexible shaft 44. This extension is received in an axially extending aperture 118 in the worm 106, and it has a radially projecting lug 120 adjacent its upper end which engages in an elongated axial slot 122 in the extension on the upper end of the worm. Thus, the shaft and worm are fixed against relative rotation but may be moved axially relative to each other.

In operation the worm wheel 102 is driven in a counterclockwise direction as seen in Fig. 3. As a result, an axial thrust is imparted to the worm 106 and, to minimize friction due to this thrust, a thrust bearing 124 is interposed between the inner end of the bushing 114 and a shoulder 126 at the base of the reduced upper extension 112 on the worm. To limit axial play of the worm 106 relative to the gear box, metal washers or shims 128 are secured on the lower reduced end 108 of the worm between the inner end of the lower bushing 110 and a shoulder 130 formed at the base of this reduced end.

In order to provide lubrication for the moving parts in the gear box, the bushings 100, 110 and 114 are made from an oil impregnated powdered metal known commercially as "Oilite" which may be bronze or a ferrous base alloy. The bushings 100 are supplied with oil by a pair of oil soaked felt washers 132 (Fig. 4) engaged upon the inner ends of these bushings. An oil soaked felt washer or ring 134 (Fig. 3) surrounds the inner end of the bushing 114 and is held in place by a ball retaining ring 136 on the thrust bearing 124. The lower bushing is surrounded by a similar felt washer 138 which is held in place by a metal washer 140 large enough to engage against the end of the felt washer 138.

Since the lug 120 (Fig. 3) on the upper end of the flexible drive shaft assembly is engaged at all times in the slot 122 in the extension 112 on the worm 106, the worm will be driven whenever the generator shaft 51 is operating and the clutch elements 54 and 60 are engaged and will drive the actuating shaft 30 and cranks 32 and 34 and thereby operate the wipers 38. This driving connection may be disconnected by declutching means shown in Figs. 1 and 5–7 and now to be described.

A main pivot for the declutching mechanism is provided by a fulcrum pin 142 which extends between the front and back walls 90 and 92, respectively, of the supporting bracket 88 and projects outwardly of the front wall 90. Secured in inverted position between the supporting bracket walls 90 and 92 is a generally U-shaped yoke or lever 144 (Figs. 1 and 5). At its rear end (right-hand end in Fig. 5) the lever 144 has a rearwardly projecting lug 146 which, under conditions of operation to be described, engages and may rock or pivot upon the fulcrum pin 142. However, it is to be noted that the lever 144 does not have a fixed connection with the fulcrum pin 142. Instead, the rear end of the lever is free to float or move vertically relative to the fulcrum pin at certain stages in the operation of the cleaner. The conditions of operation under which it pivots or rocks, and the stages at which it floats relative to the fulcrum pin, will be described in detail subsequently.

The opposite or forward end of the lever 144 is provided with a pair of forwardly extending fingers 148 which engage under an enlarged cap or abutment 150 fixed on the outer end of the extension 116 on the flexible shaft 44. As a result, when the lever 144 is moved to a position where it is free to rock in a clockwise direction from its position, as seen in Fig. 5, the fingers 148 engaging under the abutment 150 will tend to draw the flexible shaft upwardly and thus move the clutch element 60 out of engagement with the clutch element 54 and thereby disconnect the drive to the operating mechanism 26.

Movement of the lever 144 to a position where it is free to rock in the manner above mentioned is effected by a control plate 152 (Figs. 6 and 7) which forms a support for the lever. This control plate is rockably secured upon the forwardly projecting end of the fulcrum pin 142 (Fig. 1), a washer 154 being interposed between the control plate and the front wall 90 of the supporting bracket 88, so that the control plate 152 is free to rock without binding.

The lever 144 is connected to the control plate 152 by means of a pin 156 (Figs. 1, 6 and 7), the connection being such that the lever moves with the control plate and may also be rocked relative thereto. The pin 156 extends through an arcuate slot 158 in the front wall 90 of the supporting bracket 88. This slot has its center at the axis of the fulcrum pin 142 so that the ends of the slot form fixed means limiting rocking movement of the control plate.

Normally the control plate 152 and lever 144 are urged to the position shown in Figs. 5 and 6 by a coil spring 160. At its upper ends this spring is hooked through an offset lug 162 (Figs. 1 and 5) in the upper side of the lever between the rear end of the lever and the pivot pin 156. The convolutions in the lower end of the spring 160 are engaged with or threaded into a spiral groove on the upper end of a headed pin or stud 164 which passes freely through an aperture in a rearwardly bent ear 166 on the lower edge of the front wall 90 of the supporting bracket 88. A kerf 167 may be provided in the head of the stud 164 to facilitate turning of the same with a screw driver. By virtue of this construction, the tension in the spring 160 can be adjusted by turning the stud 164 in one direction or the other, depending on whether more or less tension is desired in the spring.

Since the spring 160 is always under tension, it will normally urge the control plate 152 and lever 144 to the position shown in Figs. 5 and 6, at which position the pin 156 engages against the lower end of the slot 158. At this position of the declutching mechanism the clutch elements 54 and 60, by means of which the flexible drive shaft 44 is operatively connected to the power take-off 48, will be held in engaged position by the spring 66. By reason of the pivotal mounting of the control plate 152 on the fulcrum pin 142 and the pivotal connection between the lever 144 and the control plate, these parts are rockable to the position shown in Fig. 7 for disconnecting the flexible drive shaft 44 from the power take-off 48.

The mechanism for rocking the control plate 152 is best seen in Figs. 6 and 7. As there indicated, the crank 32 on the front side of the operating mechanism has a backwardly or axially projecting lug 168 on its periphery while the control plate 152 carries an elongated abutment member or slide 170 in parallel slide forming lugs 172 swaged in the front side of the plate. The abutment member 170 is slidable longitudinally of the plate in these slide forming lugs between the inoperative position shown in Fig. 6 and the operative position shown in Fig. 7.

When it is in inoperative position, it is outside the path of rotation of the lug 168 but when this slidable abutment member is moved to its operative position (Fig. 7) its free end projects into the path of rotation of the lug 168 on the crank 32. Since this crank and lug rotate in a clockwise direction, as seen in Figs. 6 and 7, when the cleaner is operating, the lug 168, at a certain point in its rotation, will engage under the slidable abutment 170 and will cause the control plate 152 to be rocked in a counterclockwise direction from the position shown in Fig. 6 to the position shown in Fig. 7.

During the course of the rocking movement of the control plate 152, above mentioned, the drive shaft 44 is moved axially in a direction to disconnect the clutch elements 54 and 60 by the lever 144 which is rocked relative to the plate upon the pivot 156 in a manner now to be described. Movement of the control plate and lever under the influence of the rotating lug 168 is resisted by the adjusting spring 160 connected to the rear end of the lever and by the shaft biasing spring 66 which, through the drive shaft 44 and the cap 150 on its outer end, acts against the fingers 148 on the forward end of the lever. Thus the control plate and lever are urged by these two springs to the position shown in Figs. 5 and 6, in which the pin 156 engages against the lower end of the slot 158 and thus limits movement of these members. In addition to the resistance of the springs 66 and 160 the inertia of the shaft 44 and the friction between the clutch elements 54 and 60 when the cleaner is operating, greatly increase the resistance of the drive shaft 44 to axial movement in a direction to disconnect the clutch element.

In order to secure declutching movement of the shaft 44 with a snap action so that there is less likelihood of the clutch elements 54 and 60 being chipped or otherwise damaged during declutching, the spring 160 is so adjusted that its resistance to expansion is less than the resistance of the shaft 44 to axial movement during the initial portion of the rocking movement of the control plate 152. As a result, during this interval, the forward end of the lever 144 which is engaged under the cap 150 on the upper end of the shaft 44 remains stationary, while the rear end rises relative to the fixed fulcrum pin 142 thereby expanding the spring 160 and increasing the force it exerts on the rear end of the lever. Upon continued upward rocking movement of the control plate 152, a point is reached where the spring 160 becomes sufficiently energized by its continued expansion to cause the drive shaft 44 to start to move axially in a direction to disconnect the clutch elements 54 and 60. As soon as these elements begin to separate, the reduced area of contact between their engaged surfaces reduces their frictional resistance to separating movement to such an extent that the energy in the spring 160 greatly exceeds that necessary to overcome the resistance of the drive shaft 44 to axial movement in a direction to disconnect the clutch elements 54 and 60. Thereupon the lever 144 will be rocked by the spring 160 with a snap action in a counterclockwise direction (Figs. 6 and 7) upon the pin 156. Under normal operating conditions, this will occur before the lug 168 on the crank arm 32 overruns the slide 170. This moves the lever to the position shown in Fig. 7 and causes the shaft 44 to be drawn axially upwardly sufficiently to disengage the clutch elements 54 and 60 and thus discontinue operation of the cleaner.

It will be understood that the lug 168 on the crank arm 32 is so located relative to this crank arm and the rear crank arm 34 that disconnection of the drive shaft 44 from the power take-off 48 occurs when the wiper blades 38 are at the outermost part of their stroke. It will also be understood that the point at which disconnection of the drive shaft occurs can be varied within limits by turning the adjusting stud 164 and thus varying the tension in the spring 160. The need for additional mechanism to park the wiper blades other than the declutching mechanism is thus obviated.

Should the clutch elements 54 and 60 or the flexible shaft assembly 44 jam so that the latter cannot be moved axially when the slidable abutment member 170 is moved to operative position, then the rear end of the lever 144 will continue to rise until the lug 168 overruns the slide 170. Under these abnormal conditions the lever 144 in effect pivots upon the fingers 148 throughout the rocking movement of the control plate. Damage to the cleaner operating mechanism under the circumstances above mentioned is thus avoided.

Manually operated control means are provided for operating the slidable abutment member 170 as best seen in Figs. 1 and 6. This control means includes a Bowden wire cable 174 connected at one end to the slidable member and at the other end to a control knob or button 176 which is adapted to be carried upon the instrument panel 22 of the vehicle. The Bowden wire is secured to the slidable abutment member by pinching it between the body of this member and a plurality of crimped down lugs 178 formed in this body. It is guided for movement relative to the control plate 152 by a clamping bracket 180 fixed to the front side of the control plate and engaged over the end of the Bowden wire sheath.

At its opposite end the Bowden wire is fixedly secured to a rigid extension 182 which has the knob or handle 176 on its other end for manual manipulation thereof. This extension slides in anchoring means including an outer sleeve 184 having a terminal flange 185 abutting against the back side of the instrument panel 22 and a nut or plug 186 projecting through an aperture in the instrument panel and threaded into the end of the sleeve 184. A flange on this nut engages a bezel 188 on the outer side of the instrument panel so that the sleeve 184 is drawn into firm engagement with the back side of the instrument panel when the nut 186 is tightened and the whole assembly thus is rigidly secured in position. It will be apparent that by pushing inwardly on the knob 176 when the parts are in the position shown in Fig. 1, the slidable abutment member 170 will be moved to operative position and operation of the cleaner will thereupon be discontinued.

When the cleaner is operating, the front and rear cranks 32 and 34, respectively, on the actuating shaft 30 (Figs. 1 and 8) reciprocate the connecting rods or links 40 which are operatively connected to the wiper blade operating arms 36 by a mechanism about to be described. The inner ends of these links are secured to their respective cranks by means of crank pins 190 which are approximately 180° out of phase, as best seen in Fig. 1, so that wiper blades 38 move in unison but in opposite direction. These blades and the blade arms 36 for operating the same may be of more or less conventional construction.

Each blade is driven by a wiper rock shaft 192 (Figs. 9-11) rockably mounted in suitable bearings carried in a sleeve 194 secured to the cowl 20 of the vehicle, as seen in Fig. 9. At its inner end the bearing sleeve 194 is welded to a channel shaped mounting plate 196 formed to engage the back or inner side of the cowl. The bearing sleeve 194 projects through an aperture in the cowl, and a spacing sleeve 198 is received over the outer projecting end of the sleeve 194 of somewhat less length than the projecting portion of this sleeve. This entire assembly is rigidly secured in position by tightening a nut 200 on the end of the bearing sleeve 194 which projects from the spacer 198 until the mounting plate 196 is drawn into firm engagement with the back side of the cowl 20. Preferably a gasket 202 is interposed between the spacer 198 and the outer side wall of the cowl to provide a water-tight seal at this union.

In addition to providing a fixed support for the wiper rock shafts 192 above described, the mounting plates 196 also provide anchorage for securing the operating mechanism of the cleaner in a vehicle, as seen in Figs. 8 and 9. The web or central portion of the mounting plates 196 is extended to form a depending part 204, and the outer ends of the supporting bar 28 are fixed to the extensions 204. Thus a simple supporting structure is provided for the cleaner of the present invention making it easy to install.

Each of the wiper rock shafts 192 is rocked by means of a crank arm 206 secured to the shafts on the inner side of the cowl by means of a slip drive connection (Figs. 9-11) which prevents breakage or disarrangement of the operating mechanism, should the wiper arms or blades be arrested while the cleaner is operating. In order to provide for differences in alignment of the parts which may result during the manufacture and assembly of the cleaner, an improved driving connection between the links 40 and crank arms 206, which is also disclosed in Figs. 9-11, has been provided.

Each of the crank arms 206 is stamped from sheet metal and adjacent one end they are provided with an aperture 208 adapted loosely to receive the rock shaft 192. This aperture is provided with a flange 210 notched at diametrically opposite points, as indicated at 212 (Fig. 9). A spring 214 is provided on the inner end of the rock shaft for normally holding the notches in engagement with a pin 216 fixed in the rock shaft thereby to establish a driving connection between the crank arm and the rock shaft. This spring is held on the shaft 192 by a washer 218 welded to the end of the shaft or by a C-ring engaged in a groove in the end of the shaft. If movement of a wiper arm is arrested, the spring 214 yields sufficiently to allow the pin 216 to ride out of the notches 212 so that the crank arm 206 may continue to oscillate even though the wiper arm does not. Thus damage to the operating mechanism is avoided under the above-mentioned circumstances.

Spaced from the aperture 208 in each crank arm 206 is a socket 220 (Fig. 10) for receiving the spherical end 221 of a pivot pin 222 riveted to the outer end of the links 40. The spherical head 221 on this pin is held in the socket 220 by a leaf spring 224 having reduced ends 226.

The spring 224 is secured to the crank arm 206 by passing one of the reduced ends 226 through an aperture 228 in the crank arm and by sliding the other end through the open end of a lateral slot 230 in the crank arm, which slot has an enlarged inner end diametrically opposite the aperture 228 and spaced the same distance from the socket 220. In order to prevent the spring 224 from moving out of position, its ends 226 are bent at a slight angle. Due to the flexing of the spring by the projecting head 221 on the pivot pin 220, these bent ends flatly engage the emergent side of the crank arm 206. As a result the head 221 is pressed into socket 220 and at the same time the spring 224 is anchored against displacement. An oil impregnated washer 232 may be provided surrounding the head of the pin 222 to provide lubrication at this connection.

The structure above described allows for reasonable variation in the angle between the crank arm 206 and link 40 without interfering with its effectiveness as a driving connection between these parts. Another advantage of this structure is the ease with which a cleaner may be installed in a vehicle.

Briefly reviewing the operation of the improved cleaner of the present invention, the spring 66 (Figs. 1 and 2) urges the flexible drive shaft assembly axially in a direction to move the clutch element 60 on the lower end of this shaft into engagement with the element 54 rotated by the generator shaft 51. As a result, when the knob 176 on the end of the control cable 174 is pulled out sufficiently to slide the abutment member 170 from the path of rotation of the lug 168 on the front crank 32, this spring 66 and the spring 160 connected to the lever 144 cause the lever and control plate 152 to pivot on the fulcrum pin 142 to the inoperative position shown in Fig. 6. At the same time the flexible shaft assembly 44 is moved by spring 66 to operative position, thus bringing the clutch element 54 and 60 into engagement. Thereupon the operating mechanism 26 will be operated and the wipers 38 oscillated, provided the engine which drives the generator 42 is operating. The blades will be operated in unison but approximately 180° out of phase, as indicated in Fig. 8.

At any time that it is desired to discontinue operation of the cleaner, the control knob 176 is pressed in, thus sliding the abutment member 170 into the path of rotation of the lug 168 on the front crank 32, as shown in Fig. 7. When the lug 168 strikes the underside of the abutment member 170, the control plate 152 is rocked in a counterclockwise direction (Fig. 6), thus moving the pin 156 which forms a pivot axis for the lever 144 in the same direction. Due to the fact that the resistance of the drive shaft 44 to upward axial movement is greater than the resistance of the spring 160 to expansion during the initial stages of movement of the control plate 152, the forward end of the lever 144 remains stationary during this portion of the movement of the control plate so that the fingers 148 fulcrum on the cap 150 on the outer end of the drive shaft 44 while the rear end of the lever rises relative to the fulcrum pin 142, thus expanding the spring 160.

However, the spring 160 is so adjusted that its tension increases sufficiently before the lug 168 overruns the slide 170 normally to cause the lever 144 to pivot or rock on the pin 156 in a direction to move the shaft axially a distance sufficient to move the clutch elements 54 and 60 partly out of engaged position. At the instant this occurs, the lessened frictional resistance between these clutch elements so reduces the resistance of the drive shaft 44 to axial movement that the force of the spring 160 is sufficient to rock the lever 144 on the pin 156 with a snap action so that the clutch elements 54 and 60 are separated with a snap action. This discontinues the drive to the wiper operating mechanism and, since the drag on this mechanism is relatively large, the blades 38 will stop the instant the clutch elements 54 and 60 are disconnected. During declutching of the drive shaft the rear end of the lever 144 is moved upwardly less than ¼ inch and the flexible drive shaft 44 need not be moved over ⅝ inch to disconnect the clutch elements.

In order to avoid the necessity for special parking mechanism for the blades, the lug 168 is so located relative to the crank pins 190 connecting the operating links 40 to the crank arms 32 and 34 that disconnection occurs when the wiper blades 38 are at the outermost point in their movement. The exact point at which declutching of the drive shaft 44 occurs can of course be varied by adjusting the tension in the spring 160.

Since the spring 160 and the shaft biasing spring 66 are under constant tension, the declutching mechanism will be automatically returned to inoperative position and the drive shaft 44 will be automatically returned to operative position, as shown in Fig. 6, when the control knob 176 is operated to withdraw the slide 170 from the position shown in Fig. 7 to the position shown in Fig. 6. During return movement of the parts, the lever 144 and control plate 152 pivot upon the fulcrum pin 142.

In Fig. 12 a cleaner operating mechanism constructed in accordance with a modification of the invention is shown. This operating mechanism is of duplicate construction to that already described except in the construction of the rockable lever for disconnecting the drive shaft 44, and, therefore, like numbers have been used to designate the duplicate parts.

This operating mechanism has a control plate 152 rockably secured upon a fixed fulcrum pin 142 carried by a supporting bracket 88 which has a front flange or wall 90. An inverted generally U-shaped yoke or lever 234 is carried between the walls of the supporting bracket. At its rear (left-hand end in Fig. 12) the lever 234 is recessed to provide spaced rearwardly extending lugs 236. The recessed end of the lever is engaged upon the fixed fulcrum 142 so that the rear end of the lever 234 is free to float relative to this pin but the lugs 236 limit its floating movement relative thereto to something less than ¼ inch. In this respect only the construction of the lever 234 differs from the construction of the lever 144 of the preferred form of the invention which has nothing to limit its upward floating movement.

In all other respects the operating mechanism of Fig. 12 is the same as that shown in Figs. 1-8. Thus the lever 234 is connected to the control plate 152 by a pin 156 extending through an arcuate slot 158 in the front wall 90 of the supporting bracket. It has fingers 148 on its forward end engaging under the cap 150 on the outer end of the flexible drive shaft 44. An adjusting spring 160 is connected to the lever 234 between the fulcrum pin 142 and the pivot pin 156.

The control plate 152 also carries a manually controlled slidable abutment member 170 which cooperates with a lug 168 on the front crank arm 32 of the cleaner to rock the control plate 152. When the control plate is rocked under the influence of the lug 168, the lever 234 under normal operating conditions operates to disconnect the drive shaft 44 in the same manner as the lever 144 previously described.

However, if for any reason the spring 160 fails to rock the lever 234 in this manner, then the rear end of the lever will continue to rise until the lower lug 236 on its rear end engages the fulcrum pin 142. Thereupon the lever will be positively rocked in a direction to disconnect the drive shaft 44. This occurs before the lug 168 overruns the slide 170 so that a positive operating declutching mechanism is thus provided.

From the above description it will be apparent that the improved windshield cleaner of the present invention incorporates numerous advantages. For one thing, it has relatively few parts, most of which are of standard construction or are of relatively simple form so that they may be made by stamping the same from sheet metal. This reduces the cost of manufacture of the cleaner and reduces the likelihood of breakage.

Furthermore the slip drive connection between the wiper rock shafts 192 and the crank arms 206 prevents damage to the cleaner if the wiper blades are arrested while the cleaner is operating. Compensation is also provided for misalignment of the parts in the driving connection between the drive links 40 and the crank arms 206 on the wiper rock shaft 192. This connection is of simple construction and thus inexpensive and furthermore, since it compensates for reasonable inaccuracies in manufacture, fewer precision operations are necessary in the manufacture of the cleaner and its cost may, therefore, be reduced. Furthermore this drive connection is extremely easy to assemble and, therefore, installation of the cleaner is simplified and its cost reduced.

By providing a drive means which is disconnected at the power take-off, wear on these parts is reduced, and in addition, noise which might be made thereby is avoided. It is also to be noted that the cleaner requires no special parking mechanism, yet parking of the wiper blades at their outermost or proper parking position is assured, and the mechanism which accomplishes this is adjustable and incorporates safety features which prevent damage thereto. In addition the control means for declutching the drive means is simple to operate because it does not have to be operated at any particular point in the cycle of movement of the blades 38. It may be actuated at any point in the cycle of operation and will discontinue operation of the cleaner when the blades reach parked position.

While I have shown and described a preferred embodiment of my invention, it will be apparent that numerous variations and modifications thereof may be made without departing from the underlying principles of the invention. I, therefore, desire, by the following claims, to include within the scope of the invention all such variations and modifications by which substantially the results of my invention may be obtained through the use of substantially the same or equivalent means.

I claim:

1. In a windshield cleaner including a wiper adapted to be driven from a rotary source of power, the combination comprising a cleaner operating mechanism, drive means connecting said source of power and said operating mechanism, mechanism for moving said drive means to inoperative position including a lever pivotally secured upon a rockable support and biased to move said drive means to inoperative position upon movement of said support in one direction, a rotary member driven by said shaft and having an abutment, a slide on said support reciprocable into the path of rotation of said abutment to establish a driving connection between the rotary member and support for moving the latter in the aforesaid direction, said abutment rotating in coordinated relation to the movement of said wiper to effect movement of the drive means to inoperative position when said wiper is at one end of its cycle of movement, and manually operated means for reciprocating said slide.

2. In a windshield cleaner adapted to be driven by a source of mechanical power, the combination comprising a rotatable and axially movable shaft adapted to be rotated by said source of power, cleaner operating mechanism driven by said shaft, an oscillatable member, a rockable member connected for movement with said oscillatable member and rockable relative thereto, said member being operatively connected to said shaft, and yieldable means to rock said rockable member relative to said oscillatable member upon movement of the latter in one direction for moving said shaft axially to disconnect the same from said source of power.

3. In a windshield cleaner including a wiper adapted to be driven by a source of mechanical power, the combination comprising a rotatable and axially movable shaft adapted to be connected to said source of power, cleaner operating mechanism driven by said shaft, an oscillatable member, a rockable member connected for movement with said oscillatable member and rockable relative thereto, said member being operatively connected to said shaft, yieldable means to rock said rockable member relative to said oscillatable member upon movement of the latter in one direction for moving said shaft axially to disconnect the same from said source of power, and menas including an element subject to manual control and a part rotated by said shaft in coordinated relation with said operating mechanism for oscillating said oscillatable member in the aforesaid direction when said wiper reaches one extreme in its cycle of movement.

4. In a windshield cleaner adapted to be driven by a source of mechanical power, the combination comprising a drive shaft adapted to be rotated by said source of power, cleaner operating mechanism driven by said shaft, an oscillatable member, a rockable member connected for movement with said oscillatable member and rockable relative thereto, said member being operatively connected to said shaft, yieldable means to rock said rockable member relative to said oscillatable member upon movement of the latter for disconnecting said shaft from said source of power, and spaced abutments on said rockable member adapted to engage a fixed part on said cleaner for determining the limits of rocking movement of said rockable member, one of said abutments being effective upon engagement with the fixed part of said cleaner positively to rock said rockable member in a direction to disconnect said shaft should said yieldable means fail to rock the same upon movement of said oscillatable member.

5. In a windshield cleaner adapted to be driven from a source of mechanical power, the combination comprising a drive shaft adapted to be rotated by said source of power, cleaner operating mechanism driven by said shaft, rockably interconnected first and second members, said first member being rockable upon an axis independent of the axis of relative rocking movement and said second member being operatively connected to said shaft, cooperating means including a manually controlled part and a part rotated by said shaft for establishing a driving connection between said shaft and said first rockable member for rocking the latter upon said independent axis, and yieldable means to rock said second rockable member upon rocking movement of said first member for disconnecting said shaft from said source of power.

6. In a windshield cleaner adapted to be driven from a source of mechanical power, the combination comprising a cleaner drive shaft, releasable clutch means for connecting said shaft to said source of power, cleaner operating mechanism driven by said shaft, declutching mechanism for releasing said clutch means by axially moving said shaft including rockably interconnected first and second members, said first member being rockable upon an axis independent of the axis of relative rocking movement and said second member being operatively connected to said shaft, means for rocking said first rockable member upon said independent axis including a rotatable part driven by said shaft and a manually controlled element for establishing a driving connection between said rotatable part and first rockable member, yieldable means to rock said second rockable member upon rocking movement of said first member for moving said shaft axially to release said clutch, and resilient means for moving said shaft axially to connect said clutch means when said declutching mechanism is released.

7. In a windshield cleaner adapted to be driven by a source of rotary power, the combination comprising a cleaner operating mechanism, drive means connecting said source of power and said operating mechanism, a pivotally supported control member, a lever rockably supported upon said control member and operable to impart an axial thrust to said drive means in a direction to disconnect the same from said source of power, a spring to rock said lever in a direction to disconnect said drive means, and means for rocking said control member in a direction to energize the spring for rocking the lever including a rotatable member driven by said drive means and a manually operable element adapted to be moved into the path of rotation of said rotatable member to establish a driving connection between said latter member and control member for rocking the latter.

8. In a windshield cleaner adapted to be driven by a source of rotary power, the combination comprising a cleaner operating mechanism, drive means connecting said source of power and operating mechanism, a pivotally supported control member, a lever operatively connected to said drive means and pivotally secured to said control member for rocking movement with the latter and relative thereto to move said drive means to inoperative position, a fixed pivot axis on said cleaner, a spring connected to said lever effective through the pivotal connection between said lever and control member to pivot the control member and lever relative to said fixed pivot axis in a direction to render the lever ineffective to move said drive means to inoperative position, and means for rocking said control member to shift the position of the pivotal connection between the control member and lever in a direction to free the lever for rocking movement upon said connection under the influence of said spring whereby said drive means is moved to inoperative position.

9. A windshield cleaner as set forth in claim 8, wherein the means for rocking the control member includes a manually controlled element and a member rotated by said drive means in timed relation to said operating mechanism for engaging said manually controlled element to establish a driving connection with said control member at a predetermined point in the cycle of operation of said operating mechanism.

10. In a windshield cleaner adapted to be driven by a source of rotary power, the combination comprising a cleaner drive shaft adapted to be rotated by said source of power and to be moved axially to disconnect the same therefrom, an oscillatable support, a member rockable upon a first axis carried by said support, said member being operatively connected with said shaft, means driven by said shaft for oscillating said support in one direction, yieldable means energized upon the movement of said support in the said direction to render the said yieldable means effective to rock said rockable member upon said first axis in a direction to move said shaft axially and disconnect the same from said source of power, and fixed means forming an axis for said support and a second axis for said rockable member upon which said parts are rocked by said yieldable means to return the same to their inoperative positions when said means for moving said support is rendered ineffective.

11. In a windshield cleaner adapted to be driven by a source of rotary power, the combination comprising a cleaner operating mechanism, drive means between said source of power and operating mechanism, a pivotally supported control member, a lever operatively connected to said drive means and pivotally secured to said control member for rocking movement with the latter and relative thereto to disconnect the drive means from said source of power, a spring biasing said control member to one position and said lever for rocking movement relative thereto upon movement of said control member from said position, fixed means for preventing rocking movement of the lever when the control member is in the said position, and means driven by said drive means for rocking said control member from said position to shift the position of the pivotal connection of said control member and said lever in a direction to free the lever for rocking movement under the influence of said spring, thereby to move the drive means to inoperative position.

12. In a windshield cleaner adapted to be driven from a rotary source of power, the combination comprising a cleaner operating mechanism, drive means connecting said source of power and said operating mechanism, mechanism for moving said drive means axially to inoperative position including a lever pivotally secured upon a movable support, means for moving said movable support in one direction including a rotary part driven by said drive means and a manually controlled part for establishing a driving connection between said rotary part and movable support, a spring energized upon movement of said support in said one direction for rocking said lever in a direction to move said drive means to inoperative position, fixed means relative to which said lever is adapted to float upon yielding of said spring during rocking movement of said movable support, and cooperating means on said lever adapted to engage said fixed means positively to rock said lever and move said drive means to inoperative position before said rotary part overruns said manually controlled part should said spring fail to rock said lever.

13. In a windshield cleaner adapted to be driven by a source of rotary power, the combination comprising a cleaner operating mechanism, drive means between said source of power and operating mechanism, a pivotally supported control member, a lever operatively connected to said drive means and pivotally secured to said control member for rocking movement with the latter and relative thereto to disconnect the drive means from said source of power, a spring biasing said control member to one position and said lever for rocking movement relative thereto upon movement of said control member from said position, fixed means for preventing rocking movement of the lever when the control member is in the said position, means for rocking said control member from said position to shift the pivot axis of said lever in a direction to free the same for rocking movement in a direction to move the drive means to inoperative position including a rotary part driven by said drive means and a manually controlled part for establishing a driving connection between said rotary part and control member, and means positively to rock said lever in a direction to move said drive means to inoperative position before said rotary part overruns said manually controlled part should said spring fail to rock said lever.

14. In a windshield cleaner to be driven by a source of mechanical power, the combination of a cleaner operating mechanism, a clutch forming disengageable driving means to connect the mechanism to the source, a movable member, a rocker operable to disengage the clutch, pivot means rotatably mounting the rocker on the member, yieldable means to urge the rocker in a direction to disengage the clutch, and means forming a manually disengageable operating connection between the operating mechanism and the member to shift the pivot for charging the yieldable means to disengage the clutch.

JOHN VICTOR STANLEY DAHLGREN.

REFERENCES CITED

The following references are of record in the file of this patent:

UNITED STATES PATENTS

| Number | Name | Date |
| --- | --- | --- |
| 810,961 | Miller | Jan. 30, 1906 |
| 1,152,227 | Sanborn | Aug. 31, 1915 |
| 2,031,830 | Hansmann | Feb. 25, 1936 |
| 2,079,573 | Lauer | May 4, 1937 |
| 2,088,826 | Whitted | Aug. 3, 1937 |
| 2,099,244 | Temple | Nov. 16, 1937 |
| 2,129,619 | Horton | Sept. 6, 1938 |
| 2,376,010 | Sacchini | May 15, 1945 |
| 2,450,692 | Sacchini | Oct. 5, 1948 |

FOREIGN PATENTS

| Number | Country | Date |
| --- | --- | --- |
| 501,941 | Great Britain | Mar. 8, 1939 |